Patented Jan. 7, 1941

2,228,118

UNITED STATES PATENT OFFICE 2,228,118

PROCESS FOR THE PRODUCTION OF NONKNOCKING MOTOR FUELS

Hermann Kaufmann, Leuna, and Walter Simon, Ludwigshafen-on-the-Rhine, Germany, assignors, by mesne assignments, to William Ellyson Currie, New York, N. Y.

No Drawing. Application May 3, 1939, Serial No. 271,506. In Germany May 9, 1938

10 Claims. (Cl. 196—50)

The present invention relates to a process for the production of nonknocking motor fuels.

It has already been proposed to heat reduction products of carbon monoxide which are liquid at ordinary or elevated temperatures, together with hydrocarbon products poorer in hydrogen to temperatures above 300° C., if desired in the presence of catalysts immune to sulphur and with an addition of hydrogen under pressure in order to obtain motor fuels. The yields, however, often leave much to be desired, even when very high pressures, as for example those of 300 atmospheres, are used.

We have now found that good yields of nonknocking benzines can be obtained without trouble while using rigidly arranged catalysts and with the formation of only small amounts of gaseous hydrocarbons by using pressures of more than 350 atmospheres in the presence of nonoxidizing gases.

The nonoxidizing gases used in this process should either be inert, as is the case for example with methane and nitrogen, or preferably should be reducing gases, among which latter group hydrogen is particularly suitable. The temperatures should be sufficiently high to effect at least a certain cracking or splitting of the initial materials. Since by such cracking the boiling point of the materials under treatment is lowered, it is essential that the initial materials should have a boiling point range which at least in part is higher than that of the desired motor fuels. Usually products will be treated which boil above 200° C. The reduction products of carbon monoxide should essentially consist of hydrocarbons but in addition thereto may contain a certain amount of organic compounds containing oxygen. They should be liquid or solid at ordinary room temperature, i. e. normally nongaseous. Under the reaction conditions they are, of course, at least partly in the vapor state. Also the added hydrocarbon products lower in hydrogen should be normally nongaseous.

Among the reduction products of carbon monoxide there may be used in particular fractions boiling above 200° C., the so-called cogasine. This, after being mixed with tars, tar oils, liquid destructive hydrogenation products poor in hydrogen of coals, tars, mineral oils or pressure extracts of coals, peat and the like, is led together with an inert gas, such as for example methane or nitrogen, or preferably with hydrogen, under pressures of for example 400 to 600 atmospheres at temperatures above 400° C., usually of from 450° to 650° C., preferably from 450° to 550° C., over catalysts having a splitting action. Suitable catalysts are mainly heavy metal sulphides, as for example the sulphides of the metals of the 5th or 6th groups of the periodic system or the iron group or mixtures of sulphides of metals of the 6th group and sulphides having a weak hydrogenating action, as for example iron sulphide. Oxides of the metals of the 5th to the 8th, in particular the 5th and 6th, groups of the periodic system may also be used. The catalysts, in particular the sulphides, may be applied to carriers, such as for example bleaching earth or lignite low temperature coke. The catalysts are rigidly arranged in the reaction vessel and are preferably used in a shaped condition.

The following example will further illustrate how the present invention may be carried out in practice but the invention is not restricted to this example. The parts are by weight.

Example 62 parts of a carbon monoxide reduction product boiling between 200° and 325° C. are mixed with 38 parts of a tar middle oil boiling from 220° to 330 C. obtained from mineral coal and led at 450 C. together with hydrogen under a pressure of 450 atmospheres over a catalyst consisting of bleaching earth with 10 per cent of tungsten sulphide. By a single passage there are obtained from the mixture 40 per cent of benzine having a specific gravity of 0.745.

If the same reaction be carried out at 300 atmospheres, there is obtained at first only 25 per cent of benzine and the activity of the catalyst subsides so rapidly that after about a week only 15 per cent of benzine are obtained.

What we claim is:

1. The process of producing a nonknocking motor fuel which comprises heating to a cracking temperature a mixture of a normally nongaseous reduction product of carbon monoxide essentially consisting of hydrocarbons and having at least in part a boiling point range higher than that of the desired motor fuel with a normally nongaseous hydrocarbon product having at least in part a boiling point range higher than that of the desired motor fuel and lower in hydrogen than said reduction product, in the presence of a stationarily arranged catalyst having a splitting action and of a nonoxidizing gas under a pressure above 350 atmospheres.

2. The process as claimed in claim 1, in which the temperature is at least 400° C.

3. The process as claimed in claim 1, in which the temperature is between 450° and 650° C.
4. The process as claimed in claim 1, in which the temperature is between 450° and 550° C.
5. The process as claimed in claim 1, in which the pressure is between 400 and 600 atmospheres.
6. The process as claimed in claim 1, in which the nonoxidizing gas is hydrogen.
7. The process as claimed in claim 1, in which the temperature is between 450° and 550° C., the pressure is between 400 and 600 atmospheres and the nonoxidizing gas is hydrogen.
8. The process as claimed in claim 1, in which said reduction product boils above 200° C.
9. The process as claimed in claim 1, in which said reduction product boils between 200° and 325° C.
10. The process as claimed in claim 1, in which said hydrocarbon product is a tar oil.

HERMANN KAUFMANN.
WALTER SIMON.